(12) United States Patent
Kamata et al.

(10) Patent No.: US 8,907,579 B2
(45) Date of Patent: Dec. 9, 2014

(54) LUMINAIRE

(71) Applicant: Toshiba Lighting and Technology Corporation, Kanagawa (JP)

(72) Inventors: Masahiko Kamata, Yokosuka (JP); Kenji Takanashi, Yokosuka (JP)

(73) Assignee: Toshiba Lighting & Technology Corporation, Kanagawa (JP)

( * ) Notice: Subject to any disclaimer, the term of this patent is extended or adjusted under 35 U.S.C. 154(b) by 0 days.

(21) Appl. No.: 14/145,834

(22) Filed: Dec. 31, 2013

(65) Prior Publication Data

US 2014/0184087 A1    Jul. 3, 2014

Related U.S. Application Data

(63) Continuation of application No. 13/418,185, filed on Mar. 12, 2012, now Pat. No. 8,643,295.

(30) Foreign Application Priority Data

Mar. 29, 2011    (JP) ................... 2011-072439

(51) Int. Cl.
*H05B 37/02* (2006.01)
*H05B 33/08* (2006.01)

(52) U.S. Cl.
CPC ............ *H05B 37/02* (2013.01); *H05B 33/0851* (2013.01); *H05B 33/0818* (2013.01)
USPC .................... 315/206; 315/224; 315/291

(58) Field of Classification Search
USPC ................. 315/206, 224, 291, 307, 308
See application file for complete search history.

(56) References Cited

U.S. PATENT DOCUMENTS

| | | | |
|---|---|---|---|
| 6,259,614 B1 | 7/2001 | Ribarich et al. | |
| 8,222,872 B1 | 7/2012 | Melanson et al. | |
| 2003/0227263 A1 | 12/2003 | Benensohn | |
| 2008/0018261 A1 | 1/2008 | Kastner | |
| 2008/0030143 A1* | 2/2008 | Goriki et al. | 315/209 R |
| 2013/0049621 A1* | 2/2013 | Yan et al. | 315/205 |
| 2013/0342121 A1* | 12/2013 | Matsumoto | 315/200 R |

FOREIGN PATENT DOCUMENTS

| | | |
|---|---|---|
| JP | 2002-231471 A | 8/2002 |
| WO | 2005115058 A1 | 12/2005 |
| WO | 2008112820 A2 | 9/2008 |

OTHER PUBLICATIONS

European Search Report dated Jul. 9, 2012, filed in European counterpart Application No. 12159338.8, 7 Pages.

* cited by examiner

*Primary Examiner* — Don Le
(74) *Attorney, Agent, or Firm* — Patterson & Sheridan LLP

(57) ABSTRACT

When an operator operates an operation tool of a dimming operation terminal device in order to set the brightness of a lighting load to desired brightness, an energization electric signal, for example, a voltage level detected by a dimming control section changes. The dimming control section generates a dimming signal modulated according to the voltage level. Power supply to the dimming control section is performed by an insulated auxiliary power supply. Transmission of the dimming signal is performed via an insulating section.

2 Claims, 2 Drawing Sheets

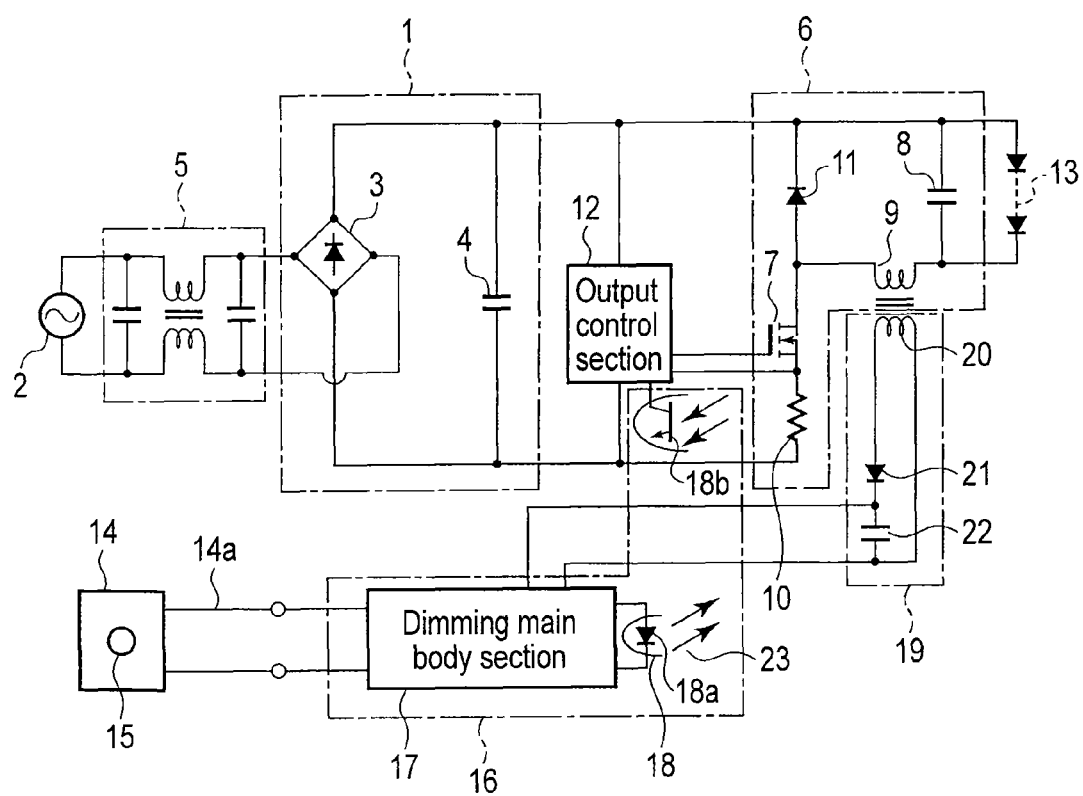
F I G. 1

LUMINAIRE

CROSS-REFERENCE TO RELATED APPLICATIONS

This application is a continuation of co-pending patent application having Ser. No. 13/418,185, filed Mar. 12, 2012, which is based upon and claims the benefit of priority from prior Japanese Patent Application No. 2011-072439, filed Mar. 29, 2011, the entire contents of which are incorporated herein by reference.

FIELD

Embodiments described herein relate generally to a luminaire that chops a direct-current voltage obtained by rectifying an alternating-current power supply voltage to convert the direct-current voltage into a required voltage, drives a lighting load with the converted voltage to cause the lighting load to emit light, and varies the brightness of the lighting load according to the operation of a dimming operation terminal device.

BACKGROUND

In the past, a luminaire is proposed that controls a conduction phase of a lighting load such as a light-emitting diode (LED) and dimly lights the lighting load. "Dim" means adjusting the brightness of lighting. A dimming operation terminal device in such a luminaire is connected between an alternating-current power supply and the lighting load and subjects a load current to phase control. Such a dimming operation terminal device of a phase control system is provided to be embedded in or exposed from a wall or the like. An operator can operate a rotary or sliding operation tool provided on the front surface of the dimming operation terminal device, change a conduction phase of a phase control type dimmer, and change the brightness of a lighted place lighted by the lighting load to desired brightness.

Such a phase control type dimmer subjects a power supply voltage itself supplied to the lighting load to phase control. Usually, such a phase control type dimmer is referred to as two-wire dimmer.

On the other hand, a dimmer of a type for transmitting, via a signal line separated from a power supply line, a dimming signal to a lighting device that lights a lighting load is proposed. Such a dimmer of the type for transmitting the dimming signal via the signal line is sometimes referred to as four-wire dimmer.

In the past, a dimmer is known that lights an LED (light-emitting diode) using a boost chopper circuit, transmits a duty-variable (PWM-controlled) dimming signal from a dimming operation terminal device via a signal line, and controls an output of the boost chopper circuit to dimly light the LED.

In general, such a dimming operation terminal device that generates the duty-variable dimming signal obtains a voltage for dimming operation from an alternating-current power supply. In such a case, in general, a commercial alternating-current voltage is stepped down by resistance division, a transformer, or the like and then rectified and smoothed (further converted into a constant voltage according to necessity) to obtain a desired direct-current voltage.

However, a power supply for the dimming operation terminal device in the past explained above needs to step down a relatively high-voltage alternating-current power supply to generate a relatively low voltage. Therefore, the power supply has a complicated configuration and the terminal device tends to be increased in size. If the dimming operation terminal device is not sufficiently electrically insulated from the alternating-current power supply and a lighting device, safety against an electric shock of the operator is not guaranteed. When plural dimming operation terminal devices are provided in parallel, electrical insulation needs to be sufficiently taken into account. When another electric appliance such as an intercom and the dimming operation terminal device are set adjacent to each other at home, electrical insulation between the terminal device and the other appliance needs to be sufficiently taken into account. In order to secure such insulation, the dimming operation terminal device is often requested to have a complicated configuration.

When a power supply for the dimming operation terminal device is formed using an insulated step-down transformer, the power supply has a complicated configuration and is increased in size. Besides the dimming operation terminal device that includes the power supply for dimming operation by itself and transmits a duty-variable (PWM-controlled) dimming signal, there is a dimming operation terminal device that does not include a power supply for operation by itself and causes a lighting device to generate a dimming signal according to operation. In such a dimming operation terminal device, for example, a variable resistance section is provided in the dimming operation terminal device, a voltage is supplied from a lighting device side to the variable resistance section, and the dimming operation terminal device changes the resistance of the variable resistance section to thereby transmit a variable voltage signal to the lighting device side. In this case, the dimming operation terminal device is also requested to be electrically insulated from the alternating-current power supply and the lighting device side.

Therefore, there is a demand for a luminaire in which a dimming operation terminal device is electrically insulated from an alternating-current power supply and a lighting device, a power supply section of the dimming operation terminal device has a relatively simple configuration and is reduced in size and in weight.

BRIEF DESCRIPTION OF THE DRAWINGS

FIG. 1 is a circuit diagram of the configuration of a luminaire according to an embodiment;

DETAILED DESCRIPTION

Figure 2:
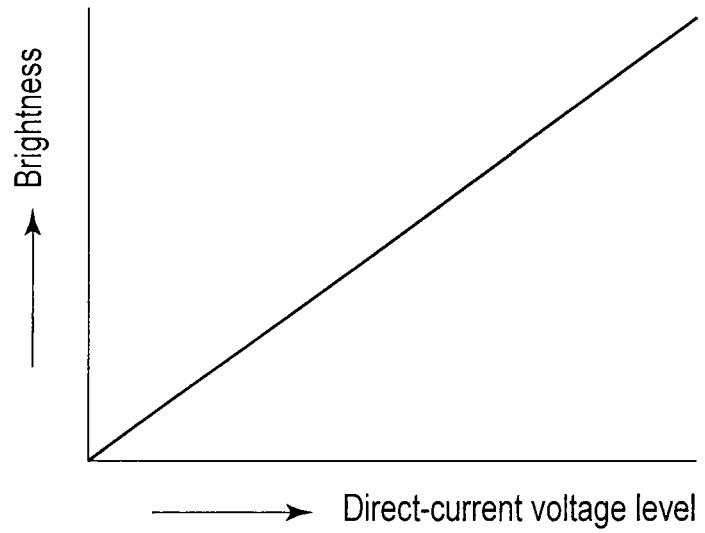
FIG. 2 is a graph for explaining the action of the luminaire shown in FIG. 1.

In general, according to one embodiment, there is provided a luminaire including: a rectifying section configured to rectify the voltage of an alternating-current power supply; a power converting section including a switching section configured to switch the output voltage of the rectifying section and supply a switching current to a lighting load and an inductor to which the switching current flow; an output control section capable of controlling the switching section and adjusting output power to the lighting load; a dimming section configured to generate a dimming signal for adjusting the brightness of the lighting load; a signal transmitting section configured to transmit the dimming signal to the output control section; and an auxiliary power supply including an auxiliary winding magnetically coupled to the inductor of the power converting section and configured to supply, as operation power of the dimming section, a part of magnetic energy generated by the inductor.

The dimming section includes a dimming operation terminal device configured to generate an energization electric signal for adjusting the brightness of the lighting load and a dimming-signal generating section electrically connected to the dimming operation terminal device and configured to generate a dimming signal modulated according to the energization electric signal.

In this embodiment, a light-emitting diode represents the lighting load. However, the lighting load may be a discharge lamp, a bulb, a laser, an organic EL element, or the like. The power converting section may be any one of a DC/AC inverter, a DC/DC converter, and the like. The DC/DC converter is allowed to be a step-up (boost) chopper, a step-down chopper, other switching type power converters, or the like. Functionally, for example, the DC/DC converter is allowed to include a constant voltage characteristic, a constant current characteristic, or a constant power characteristic.

A switching frequency of the switching section in the power converting section is set higher than the frequency of the alternating-current power supply. The switching frequency is desirably high in order to realize a reduction in the size of the power converting section and the auxiliary power supply. For example, the frequency is set to several kilohertz to several hundreds kilohertz.

The output control section only has to be capable of controlling the output power of the power converting section. The output control section may be any output control section such as an output control section that controls on-duty ratio of switching (ON period/one period of switching) or an output control section that controls a switching frequency.

The dimming operation terminal device does not include an operation power supply by itself and is operated to resultantly transmit a dimming signal. Specifically, electric power is supplied to the dimming operation terminal device from a dimming control section explained later. The supplied power is changed according to the operation by an operator. The dimming control section can detect a change in the supplied power as a change in an energization electric signal. The energization electric signal may be either a voltage or an electric current. The input impedance of the dimming operation terminal device can be changed according to, for example, an operation amount. The dimming control section supplies a constant current, a constant voltage, or constant power to the dimming operation terminal device. When the dimming operation terminal device is operated, a voltage value or a current value being output changes on the dimming control section side. The dimming control section can detect the operation of the dimming operation terminal device as a change in the energization electric signal.

Electric power supplied from the dimming control section may be either a direct current or an alternating current. However, if the electric power is the direct current, the configuration of the dimming operation terminal device and processing of the dimming signal are simple.

The dimming control section controls the output of the power converting section according to a dimming signal corresponding to the operation of the dimming operation terminal device (a dimming signal based on a change in an electric amount detected by the dimming control section according to the operation of the dimming operation terminal device). Besides, the dimming control section may include a feedback control function for driving a load with a constant voltage, a constant current, or constant power according to a signal that changes in relation to the voltage and the electric current of the load.

As an insulating section (the signal transmitting section) used for signal transmission from the dimming control section to the output control section, for example, a photo-coupler, an insulating transformer, or the like can be used. However, the insulating section may be other means.

The auxiliary power supply is a power supply for supplying a part of energy generated by the power converting section to the dimming control section. An auxiliary winding can be magnetically coupled to, for example, the inductor, which is a component of the power converting section, as a separate type winding. Besides, an insulative transformer may be provided in a component or between output terminals of the power converting section and an output winding of the transformer may be used as the auxiliary winding. In any case, since an auxiliary power supply is obtained via the auxiliary winding from a portion where a high-frequency voltage is generated, it is possible to reduce the size of the auxiliary power supply including the auxiliary winding. Since it is possible to obtain the auxiliary power supply from a portion matching the capacity of a necessary auxiliary power supply, it is possible to reduce the size and the capacity of the auxiliary power supply.

The dimming control section receives the supply of electric power from the auxiliary power supply and supplies the electric power to the dimming operation terminal device.

In a luminaire according to an embodiment, the dimming operation terminal device is electrically insulated from the alternating-current power supply and the lighting device (the power converting section) side. Therefore, even when plural dimming operation terminal devices are provided in parallel or one dimming operation terminal device controls plural lighting circuits, problems related to electrical insulation of an electric system less easily occur. A part of electric power generated by the power converting section is supplied as the operation power supply via the insulating section. Therefore, it is possible to simplify the configuration of the power supply section of the dimming operation terminal device and reduce the capacity of the power supply section.

In an embodiment, the dimming control section can supply a predetermined direct-current voltage to the dimming operation terminal device. The dimming operation terminal device can include a variable resistance section provided between input ends for the predetermined direct-current voltage. An energization electric signal detected by the dimming control section can be changed between a minimum and a maximum according to the operation of the dimming operation terminal device by the operator.

In another embodiment, the power converting section includes a switching section configured to switch the output voltage of the rectifying section, an inductor connected to the switching section in series and configured to accumulate electric power when the switching section is on and discharge the accumulated power when the switching section is off, and a capacitor connected to a lighting load in parallel and configured to receive the supply of the discharge power of the inductor. The auxiliary power supply includes an auxiliary winding magnetically coupled to the inductor.

According to such configurations, the dimming operation terminal device is electrically insulated from the alternating-current power supply and the lighting device side. Therefore, when the dimming operation terminal device is set, special consideration concerning electric insulation from other dimming operation terminal devices and lighting devices is unnecessary and wiring work is easy. The dimming operation terminal device is safe for the operator because there is no risk of an electric shock.

Moreover, it is possible to configure the auxiliary power supply in a small size and a small capacity and inexpensively.

An embodiment is explained below with reference to the accompanying drawings.

FIG. 1 is a circuit diagram of an embodiment. Reference numeral 1 denotes a rectifying section. The rectifying section 1 rectifies and smoothes the voltage of an alternating-current power supply 2 such as a commercial power supply to obtain a direct-current voltage. Such a rectifying section can be configured by a rectifier, a smoothing capacitor, a boost chopper circuit for bringing a waveform of an input current close to a sine wave to improve a power factor, or the like alone or by combining these devices as appropriate. In this embodiment, the rectifying section 1 includes a full-wave rectifier 3 and a smoothing capacitor 4.

A high-frequency blocking filter 5 that is well-known or configured as appropriate is provided between the rectifying section 1 and the alternating-current power supply 2.

An output of the rectifying section 1 is input to a power converting section 6. The power converting section 6 includes a switching section 7 that is switched at a high frequency, for example, a frequency equal to or higher than an audible frequency. Various semiconductor switching elements can be used as the switching section 7. However, in this embodiment, a field effect transistor is used. The number of switching sections 7 may be one or plural and can be set according to a circuit configuration of the power converting section 6. The switching section 7 can be configured integrally with an output control section 12 explained later. For example, when the output control section 12 is formed as an IC, the switching section 7 can be formed as the IC together with the output control section 12.

The power converting section 6 according to this embodiment includes, a series circuit of a capacitor 8, an inductor 9, and a resistor 10 for current detection, and the switching section 7 connected in series to one another. The series circuit is connected between output terminals of the rectifying section 1. In this embodiment, "in series" and "in parallel" mean that both a case in which another component is not interposed between components of the circuit and a case in which another component is interposed between the components of the circuit are included.

Further, the power converting section 6 includes a diode 11 for a flywheel that supplies the energy of the inductor 9 to the capacitor 8 in an OFF period of the switching section 7.

The power converting section 6 according to this embodiment is configured as explained above. When the switching section 7 is turned on and off at a high frequency by the output control section 12, a smoothed direct-current voltage is generated at both ends of the capacitor 8. An electric current flows to a lighting load 13, for example, a light-emitting diode (LED) to light the lighting load 13.

The power converting section 6 outputs, to the output control section 12, a signal indicating the magnitude of an electric current flowing to the resistor 10 in the ON period of the switching section 7. In other words, a voltage between both ends of the resistor 10 is output to the output control section 12.

The output control section 12 includes an IC, a microcomputer, a discrete component or the like. The output control section 12 outputs an ON signal to the switching section 7 at a predetermined period. When the voltage between both the ends of the resistor 10 reaches a predetermined value, the output control section 12 turns off the switching section 7. Specifically, the output control section 12 repeatedly outputs the ON/OFF signal at the predetermined period and turns on and off the switching section 7 at a frequency equal to or higher than the audible frequency.

The electric current flowing to the resistor 10 is not exactly the electric current flowing to the lighting load 13 but is related to the electric current. Therefore, it is possible to substantially fix a current value of the lighting load 13 by performing the feedback control as explained above.

The output control section 12 controls ON and OFF of the switching section 7 of the power converting section 6 as explained above and also controls the switching section 7 according to a control signal from a dimming control section 16 as explained later.

Therefore, the output control section 12 can separate into an ON and OFF control section for the switching section 7, a feedback control section, and a dimming control section in terms of any one of a function and a configuration or both. However, in this embodiment, the switching section 7 is shown as an integral section.

Reference numeral 14 denotes a dimming operation terminal device for adjusting brightness and 16 denotes a dimming control section. The dimming control section 16 includes a dimming main body section 17 and an insulating section (a signal transmitting section) 18. The dimming operation terminal device 14 may include an impedance varying section that can vary an impedance value or may include a pulse generating section that can change an on-duty. Further, the dimming operation terminal device 14 includes, for example, a rotary operation tool 15 that can be operated from the outside. The dimming control section 16 supplies a constant current, a constant voltage, a constant power signal, or another signal to the dimming operation terminal device 14 as an energization electric signal. When the operation tool 15 is operated (rotated), in the dimming operation terminal device 14, for example, input impedance changes and the voltage or the electric current of an energization electric signal transmission line 14a changes. The dimming main body section 17 generates a voltage signal, a current signal, a power signal, a pulse signal having a variable on-duty ratio, or the like corresponding to the change.

For example, the dimming main body section 17 supplies a direct-current voltage of about 10 V to the dimming operation terminal device 14. On the dimming operation terminal device 14 side, a variable resistor, the resistance of which continuously changes, is connected between input terminals of the about 10 V. When the variable resistor is operated by the operation tool 15, the dimming operation terminal device 14 can output an variable electric signal between about 0 V to 10 V to the dimming main body section 17.

A variable signal of a voltage is explained as the energization electric signal above. However, signals such as a current signal, a power signal, and on-duty of a pulse can also be applied. Those skilled in the art can design, as appropriate, a circuit that varies such signals.

In the dimming main body section 17, a dimming amount corresponding to a value of the variable electric signal, for example, the voltage signal that changes as explained above is set in advance. The dimming main body section 17 generates a dimming signal corresponding to an input signal. In such a dimming main body section 17, a storing section, a signal processing section, a signal transmitting section, and the like are configured using an IC, a microcomputer, or the like. FIG. 2 is a graph for explaining an example of a correspondence relation between a direct-current voltage level of an energization electric signal and the brightness of the lighting load 13. In this example, the brightness increases as an input direct-current voltage level rises. An example of a dimming signal is a PWM (Pulse Width Modulation) signal. However, the dimming signal may be a voltage level signal or the like.

The dimming signal is transmitted to the output control section 12 via the insulating section (the signal transmitting section) 18. In this embodiment, the insulating section 18 includes a photo-coupler. A light-emitting diode 18a of the photo-coupler is caused to emit light in a period of on-duty of the PWM signal and caused not to emit light in a period of off-duty of the PWM signal. The light emitted by the light-emitting diode 18a is received by a photo-transistor 18b included in the photo-coupler. A light reception signal is input to the output control section 12 as the dimming signal.

Reference numeral 19 denotes an auxiliary power supply. The auxiliary power supply 19 includes an auxiliary winding 20 magnetically coupled to the inductor 9 of the power converting section 6, a rectifier 21, and a capacitor 22. A voltage at both ends of the capacitor 22 is supplied to the dimming control section 16.

The operation of this embodiment is explained in detail below.

When the alternating-current power supply 2 is input via a not-shown switch, an alternating-current voltage is rectified by the rectifying section 1 and supplied to the power converting section 6. In the power converting section 6, the switching section 7 is controlled to be turned on and off by the output control section 12 and generates a predetermined direct-current voltage at both the ends of the capacitor 8.

The direct-current voltage at both the ends of the capacitor 8 is applied to the lighting load 13 to light the lighting load 13. Subsequently, when the operation tool 15 of the operation terminal device 14 is rotated in order to set the brightness of the lighting load 13 to desired brightness, a voltage level of the transmission line 14a changes. The dimming main body section (a dimming-signal generating section) 17 generates a dimming signal associated in advance with the change in the voltage level. The dimming signal is, for example, a PWM signal.

The dimming signal is transmitted to the output control section 12 via the insulating section (the signal transmitting section) 18. The output control section 12 outputs, for example, the PWM signal at a voltage level suitable for the driving of the switching section 7 according to the input dimming signal and changes a switching state of the switching section 7.

According to the change, it is possible to change a voltage at both the ends of the capacitor 8, change a current value of the lighting load 13, and set an optical output of the lighting load 13 to a desired value.

The optical output of the lighting load 13 may be set to the desired value by changing, according to the input dimming signal, a predetermined value compared with the voltage at both the ends of the resistor 10.

As explained above, the power supply to the dimming control section 16 is performed by the insulated auxiliary power supply 19 and the transmission of the dimming signal is performed via the insulating section 18. Therefore, the dimming operation terminal device 14 is insulated from the alternating-current power supply 2 and the power converting section 6. In other words, in the luminaire according to this embodiment, a dimming system (the dimming operation terminal device 14, the dimming control section 16, and the auxiliary power supply 19) and a driving system (the alternating-current power supply 2, the high-frequency blocking filter 5, the rectifying section 1, the output control section 12, the power converting section 6, and the lighting load 13) are electrically insulated concerning a signal and a power supply.

Figure 3:
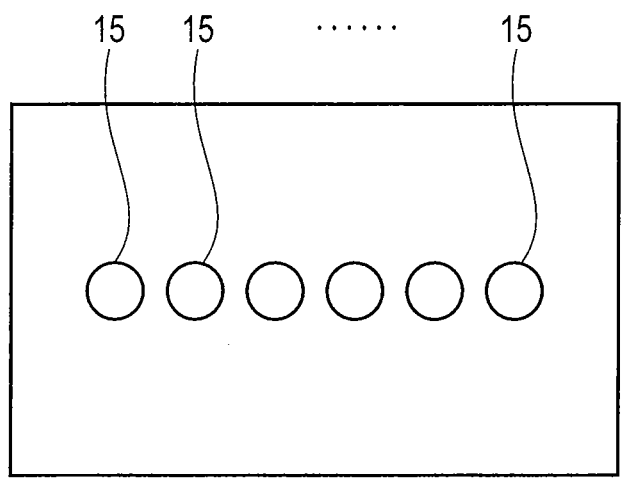
FIG. 3 is a schematic diagram of an arrangement example of operation tools of a dimming operation terminal device.

Therefore, when plural dimming operation terminal devices 14 are provided in parallel as shown in FIG. 3 to correspond to plural lighting loads 13, it is possible to perform electric wiring work without specially taking into account a potential difference among the dimming operation terminal devices 14. The work is simplified. Even when a common dimming operation terminal device 14 controls the plural lighting loads 13, it is possible to perform the electric wiring work without specially taking into account a potential difference between power converting sections 6 and the dimming control section 16. The work is simplified.

FIG. 3 is a diagram of an example in which plural operation tools 15 of the dimming operation terminal device 14 are arranged in a row. The dimming operation terminal devices 14 corresponding to the operation tools 15 are disposed on the rear surface side. However, the dimming operation terminal devices 14 are not shown in the figure.

Since the dimming system and the driving system are insulated as explained above, even if a connection polarity of the dimming operation terminal device 14 is wrong or an electric insulation failure occurs on the dimming operation terminal device 14 side, the operator does not get an electric shock.

The auxiliary power supply 19 obtains a part of generated power of the power converting section 6 via the insulating section. Therefore, it is possible to reduce the size and the capacity of the auxiliary power supply 19. It is possible to reduce the size and the cost of the entire apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A luminaire comprising:
   a rectifying section configured to rectify a voltage of an alternating-current power supply;
   a power converting section, including a switching section configured to switch an output voltage of the
   rectifying section and supply a switching current to an inductor in which the switching current flow;
   an output control section capable of controlling the switching section;
   a dimming section configured to generate a dimming signal;
   a signal transmitting section configured to transmit the dimming signal to the output control section and electrically insulate the dimming section and the output control section; and
   an auxiliary power supply including an auxiliary winding magnetically coupled to the inductor of the power converting section and configured to supply, as operation power of the dimming section, a part of magnetic energy generated by the inductor.

2. A luminaire comprising:
   a rectifying section configured to rectify a voltage of an alternating-current power supply;
   a power converting section configured to supply a current to a lighting load,
   including a switching section configured to switch an output voltage of the rectifying section and supply a switching current to an inductor in which the switching current flow;

an output control section capable of controlling the switching section and adjusting output power to the lighting load;

a dimming section configured to generate a dimming signal for adjusting brightness of the lighting load;

a signal transmitting section configured to transmit the dimming signal to the output control section and electrically insulate the dimming section and the output control section; and an auxiliary power supply including an auxiliary winding magnetically coupled to the inductor of the power converting section and configured to supply, as operation power of the dimming section, a part of magnetic energy generated by the inductor.

* * * * *